United States Patent Office 3,260,757
Patented July 12, 1966

3,260,757
METHOD OF PREPARING A 2,4-DIALKYL-6-HYDROXYBENZYL ALKYL SULFIDE
Francis X. O'Shea, Wolcott, Conn., assignor to United States Rubber Company, New York, N.Y., a corporation of New Jersey
No Drawing. Filed Aug. 1, 1963, Ser. No. 299,167
3 Claims. (Cl. 260—609)

This invention relates to a new method of preparing compounds having the general formula:

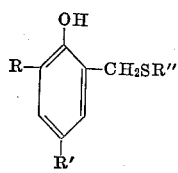

in which R and R' are alkyl, cycloalkyl or aralkyl groups of up to 12 carbon atoms each and R" is an alkyl, hydroxyalkyl, cycloalkyl, aryl or aralkyl group of up to 18 carbon atoms.

The method of the present invention involves the reaction of one molar equivalent of an intermediate compound having the general formula:

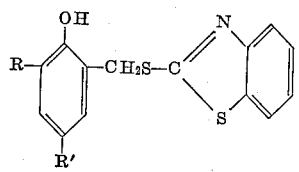

in which R and R' are the same as defined above, with one molar equivalent of an alkali metal (e.g. sodium or potassium) hydroxide and at least one molar equivalent of a mercaptan of the general formula R"SH in which R" is the same as defined above.

The intermediate may be prepared by the reaction of a phenol of the general formula:

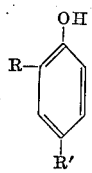

the R and R' being the same as in the above formulae, with formaldehyde and 2-mercaptobenzothiazole under acid catalysis in a reaction similar to that described in Sebrell U.S. Patents 2,134,957 (patented November 1, 1938) and 2,150,463 (patented March 14, 1939).

The prior U.S. patents to R. F. McCleary and S. M. Roberts Nos. 2,322,376 (patented June 22, 1943) and 2,417,118 (patented March 11, 1947) describe the preparation of compounds including the type

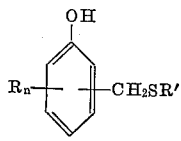

in which R and R' may be hydrocarbon radicals and $n$ is an integer of at least one by (1) the reaction of a phenolic compound with formaldehyde and an alkyl mercaptan or (2) the reaction of a phenolic Mannich base with a mercaptan. The first method gives poor yields with a 2,4-dialkylphenol, being complicated by a side reaction leading to a methylene bis phenol. The second method requires long reaction periods, a 35-hour reflux being mentioned in one example. On the other hand, the present method is rapid and complete and side reactions are negligible.

The equation for the reaction of the present invention is

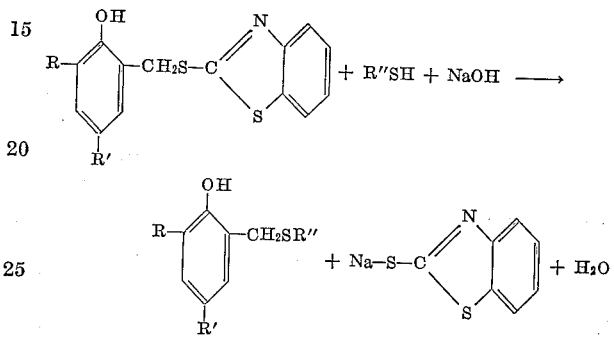

in which R, R' and R" are the same as in the formulae set forth above. The reaction is ordinarily carried out in a liquid medium comprising an organic solvent, e.g. in a water miscible organic solvent such as methanol, ethanol, isopropanol, dioxane, ethylene glycol, dimethyl ether, etc., at a temperature from about 20° C. to about 100° C. Ordinarily the reaction is carried out at the reflux temperature of the solution. The reaction may also be carried out in a two-phase system such as benzene-water, xylene-water, etc., using good agitation.

Examples of R and R' in the above formulae and reaction are methyl, ethyl, isopropyl, t-butyl, t-octyl, decyl, dodecyl, cycloheptyl, cyclohexyl, cyclooctyl, benzyl, alpha-methyl-benzyl, alpha, alpha-dimethylbenzyl, etc. Examples of 2,4-disubstituted phenols that may be used in preparing the intermediate compounds that are reacted with alkali metal sulfide are 2,4-dimethylphenol,
2-methyl-4-t-butylphenol,
2-t-butyl-4-methylphenol,
2,4-di-t-butylphenol,
2-methy-4-cyclohexylphenol,
2-cyclohexyl-4-methylphenol,
2,4-dicyclohexylphenol,
2-methyl-4-t-octylphenol,
2-t-octyl-4-methylphenol,
2,4-di-t-octylphenol,
2-nonyl-4-methylphenol,
2-methyl-4-nonylphenol,
2,4-dinonylphenol,
2-methyl-4-(alpha-methylbenzyl)phenol,
2-(alpha-methylbenzyl)-4-methylphenol,
2,4-di(alpha-methylbenzyl)phenol,
2-methyl-4-(alpha,alpha-dimethylbenzyl)phenol,
2-(alpha,alpha-dimethylbenzyl)-4-methylphenol,
2,4-di-(alpha,alpha-dimethylbenzyl)phenol, etc.

Examples of the mercaptans R″SH that may be used to react with the intermediate compounds and alkali metal hydroxide to prepare the compounds of the present invention are primary, secondary or tertiary alkyl mercaptans having 1 to 18 carbon atoms (e.g. methyl mercaptan to octadecyl mercaptan), hydroxyalkyl mercaptans such as mercaptoethanol, cycloalkyl mercaptans such as cyclohexyl mercaptan, aryl mercaptans such as thiophenol, aralkyl mercaptans such as benzyl mercaptan.

The following examples illustrate the invention. Percentages referred to herein are by weight.

EXAMPLE 1

*Preparation of 2-t-butyl-4-methyl-6-(p-t-butylphenylthiomethyl)phenol*

The intermediate 2 - hydroxy-3-t-butyl-5-methylbenzyl 2-benzothiazolyl sulfide was prepared in the following manner:

2-mercaptobenzothiazole (584.5 g., 3.5 moles) was suspended in one liter of isopropyl alcohol in a 3-liter, 3-neck flask equipped with a mechanical stirrer, condenser, thermometer and addition funnel. To the suspension was added 292 g. (3.6 moles) of 37% aqueous formaldehyde and the mixture was warmed to 60–70° C. for 30 minutes. 2-t-butyl-p-cresol (492 g., 3 moles) was then added followed by 100 ml. of concentrated hydrochloric acid. The mixture was then refluxed for four hours with stirring, the crystalline product beginning to precipitate out after one hour. The mixture was cooled and the product was filtered off, washed with isopropyl alcohol and dried. The yield of 2-hydroxy-3-t-butyl-5-methylbenzyl 2-benzothiazolyl sulfide was 744 g. (yield 72%), M.P. 164–165° C.

To a solution of 16.6 g. (0.1 mole) of p-t-butylthiophenol and 8 g. (0.1 mole) of 50% sodium hydroxide in 100 ml. of ethanol was added 34.3 g. (0.1 mole) of 2-hydroxy-3-t-butyl - 5 - methylbenzyl 2-benzothiazolyl sulfide. The solution was heated at reflux for 30 minutes. It was then poured into 300 ml. of water and the organic product was extracted with ether. The ether extract was washed with water, dried over anhyd. $Na_2SO_4$, and evaporated down to a liquid residue which slowly crystallized. The yield of 2-t-butyl-4-methyl-6-(p-t-butylphenylthiomethyl)phenol was 31.6 g. (93%), M.P. 49–50° C. after recrystallization from hexane.

*Analysis.*—Calculated: Percent C, 77.2; percent H, 8.85; percent S, 9.38. Found: Percent C, 77.0; percent H, 8.97; percent S, 9.35.

EXAMPLE 2

*Preparation of 2-t-butyl-4-methyl-6-(beta-hydroxyethylthiomethyl)phenol*

To a mixture of 686 g. (2 moles) of 2-hydroxy-3-t-butyl-5-methylbenzyl 2-benzothiazolyl sulfide and 156 g. (2 moles) of beta-mercaptoethanol in 700 ml. of ethanol was added 160 g. (2 moles) of 50% sodium hydroxide. The solution was heated at reflux for one hour and was then poured into 4 liters of cold water. The organic product was extracted with hexane-ether, washed with water, and dried over anhydrous sodium sulfate. The solvent was then removed by evaporation on the steam bath leaving a liquid residue. The yield of 2-t-butyl-4-methyl - 6 - (beta-hydroxyethylthiomethyl)phenol obtained was 502 g. (99%).

EXAMPLE 3

*Preparation of 2-(alpha,alpha-dimethylbenzyl)-4-methyl-6-(benzylthiomethyl)phenol*

The intermediate 2-hydroxy-3-(alpha,alpha-dimethylbenzyl)-5-methylbenzyl 2-benzothiazolyl sulfide was first prepared as follows:

A mixture of 226 g. (1 mole) of 2-(alpha,alpha-dimethylbenzyl)-p-cresol, 33 g. (1.1 mole) of paraformaldehyde, 167 g. (1 mole) of 2-mercaptobenzothiazole, 2 g. of p-toluenesulfonic acid and 250 ml. of benzene was placed in a one-liter, 3-neck flask and refluxed for four hours. The water of reaction (16 ml.) was azeotroped out as formed and collected in a Stark and Dean trap (theory=18 ml.). The benzene solution was washed with dilute aqueous sodium hydroxide to remove unreacted 2-mercaptobenzothiazole and was then concentrated down to a liquid residue which was crystallized from benzene. The yield of 2-hydroxy-3-(alpha,alpha-dimethylbenzyl) - 5 - methylbenzyl 2 - benzothiazolyl sulfide was 101.5 g. (33%), M. Pt. 141–143° C.

To a solution of 6.2 g. (0.05 mole) of benzyl mercaptan and 4 g. (0.05 mole) of 50% sodium hydroxide in 50 ml. of ethanol was added 20.2 g. (0.05 mole) of 2-hydroxy-3 - (alpha,alpha - dimethylbenzyl) - 5 - methylbenzyl-2-benzothiazolyl sulfide. The solution was heated at reflux for 30 minutes. It was then poured into water and the product was extracted with hexane. The hexane extract was washed with water, dried over anhydrous sodium sulfate and evaporated down on the steam bath. 2-(alpha,alpha - dimethylbenzyl) - 4 - methyl - 6 - (benzylthiomethyl)phenol was isolated as a viscous oil, wt.=15 g. (84%).

In a similar manner, the following chemicals, for example, may be prepared:

2,4-dimethyl-6-(methylthiomethyl)phenol,
2,4-dimethyl-6-(dodecylthiomethyl)phenol,
2,4-di-t-butyl-6-(cyclohexylthiomethyl)phenol,
2-(dodecylthiomethyl)-4-methyl-6-(alpha-methylbenzyl)phenol,
2-(beta-hydroxyethylthiomethyl)-4-methyl-6-(alpha,alpha-dimethylbenzyl)phenol,
2-(cyclohexylthiomethyl)-4-methyl-6-(alpha,alpha-dimethylbenzyl)phenol,
2-(phenylthiomethyl)-4,6-di-(alpha-methylbenzyl)phenol,
2-(ethylthiomethyl)-4-methyl-6-cyclohexylphenol,
2,4-di-t-butyl-6-(benzylthiomethyl)phenol,
2,4-dicyclohexyl-6-(p-nonylphenylthiomethyl)phenol,
2-dodecyl-4-methyl-6-(benzylthiomethyl)phenol,
and 2-methyl-4-cyclooctyl-6-(octadecylthiomethyl)phenol.

The compounds made by the method of the present invention are useful as antioxidants for rubbers (e.g. natural rubber, butadiene-styrene copolymer rubbers, polybutadiene, polyisoprene, ethylene-propylene copolymer rubbers, ethylene-propylene-hexadiene copolymer rubbers and the like), and for the stabilization of other organic materials which normally tend to undergo oxidative deterioration in the presence of air, oxygen or ozone, such as fats, oils, greases, gasoline, etc.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A method of preparing a compound having the general formula

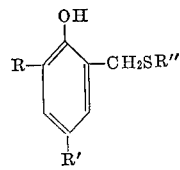

in which R and R′ are selected from the group consisting of alkyl, cycloalkyl and aralkyl groups of up to 12 carbon atoms each, and R″ is selected from the group consisting of alkyl, hydroxyalkyl, cycloalkyl, aryl and aralkyl groups of up to 18 carbon atoms, comprising treating one molar equivalent of a compound having the general formula

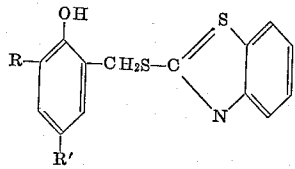

in which R and R' are as previously defined, with one molar equivalent of an alkali metal hydroxide and at least one molar equivalent of a mercaptan of the general formula R″SH in which the R″ is as previously described in a liquid medium comprising an organic solvent at a temperature from about 20° C. to about 100° C.

2. A method of preparing a compound having the general formula

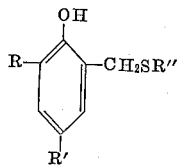

in which R and R' are selected from the group consisting of alkyl, cycloalkyl and aralkyl groups of up to 12 carbon atoms each, and R″ is selected from the group consisting of alkyl, hydroxyalkyl, cycloalkyl, aryl and aralkyl groups of up to 18 carbon atoms, comprising treating a compound having the general formula

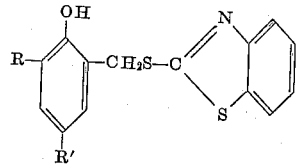

in which R and R' are as previously defined with an alkali metal hydroxide and a mercaptan of the general formula R″SH in which the R″ is as previously defined at a temperature from about 20° C. to about 100° C.

3. A method of preparing a 2,4-dialkyl-6-alkylthiomethyl phenol in which the alkyl groups have up to 12 carbon atoms each which comprises treating a 2-hydroxy-3,5-dialkylbenzyl 2-benzothiazolyl sulfide in which the alkyl groups have up to 12 carbon atoms each with an alkali metal hydroxide and an alkyl mercaptan in which the alkyl group has up to 18 carbon atoms at a temperature from about 20° C. to about 100° C.

No references cited.

CHARLES B. PARKER, *Primary Examiner.*

D. R. PHILLIPS, *Assistant Examiner.*